March 6, 1934.                M. FIELDMAN                 1,950,235
                        HYDRAULIC SHOCK ABSORBER
                        Filed June 27, 1929           3 Sheets-Sheet 1

Inventor:-
Michael Fieldman
by his Attorneys
Howson & Howson

March 6, 1934.  M. FIELDMAN  1,950,235
HYDRAULIC SHOCK ABSORBER
Filed June 27, 1929   3 Sheets-Sheet 2

Inventor:-
Michael Fieldman
by his Attorneys
Howson & Howson

March 6, 1934.  M. FIELDMAN  1,950,235

HYDRAULIC SHOCK ABSORBER

Filed June 27, 1929  3 Sheets-Sheet 3

Inventor:-
Michael Fieldman
by his Attorneys,
Howson & Howson

Patented Mar. 6, 1934

1,950,235

UNITED STATES PATENT OFFICE 1,950,235

HYDRAULIC SHOCK ABSORBER

Michael Fieldman, Philadelphia, Pa., assignor of one-half to N. A. Petry Company, Inc., Philadelphia, Pa., a corporation of Pennsylvania Application June 27, 1929, Serial No. 374,143

12 Claims. (Cl. 188—89)

This invention relates to shock absorbers of the hydraulic type and, more particularly, to that type of hydraulic shock absorbers illustrated in my prior application, Serial No. 266,676, filed April 2, 1928 for improvements in hydraulic shock absorbers.

The primary object of the invention is to provide a shock absorber which will be efficient in operation, durable, substantially free from leakage, which will automatically compensate for the effects of changing temperature upon the liquid-actuating medium, and which shall be relatively simple in form and cheap to manufacture.

A further and important object of the invention is to produce a structure of the character illustrated in my prior application in such manner that, insofar as possible, accurate finishing of the actual housing structure is eliminated and, accordingly, an apparatus produced which may be more cheaply manufactured.

A further object of the invention is to provide a shock absorber of this type in which the resistance to movement of the oscillating piston in opposite directions is made such that relatively strong resistance is provided to the movement of this piston in one direction and in which the construction is such that the assembly of the apparatus to reverse the direction, in which the resistance to movement of the piston is the greater, necessitates merely the reversal of a valve chamber forming a portion of the structure.

A further object of the invention is to provide a shock-absorber construction of this character wherein working and storage chambers are provided and separated by a partition plate and in which the construction of the housing is such that the partition plate is supported and prevented from flexing under the pressure to which it is subjected and thus causing leakage by the piston.

A still further object of the invention is to provide in a construction of this character a structure such that the storage chamber may be readily accessible when the shock absorber is in applied position, so that it may be filled without the necessity of removing the same.

These and other objects I attain by the construction shown in the accompanying drawings wherein, for the purpose of illustration, I have shown, a preferred embodiment of my invention and wherein.

Figure 1:
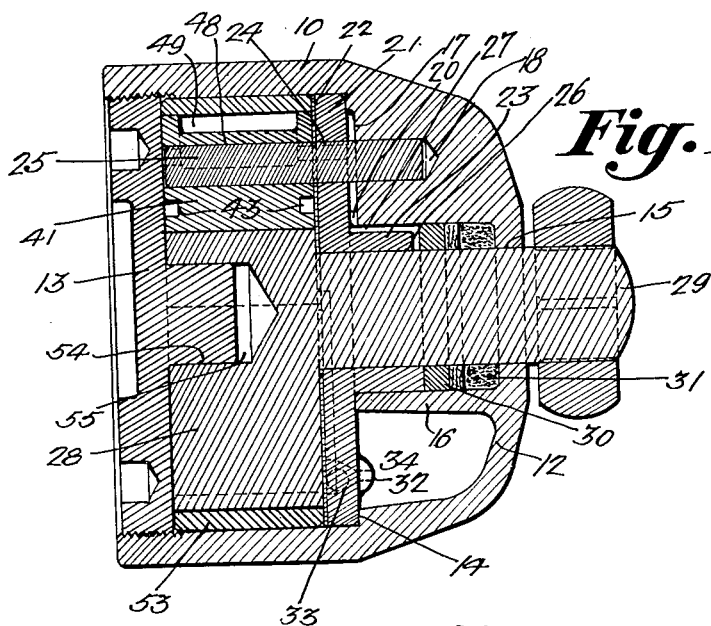
Fig. 1 is a vertical sectional view of a shock absorber constructed in accordance with my invention.
Figure 2:
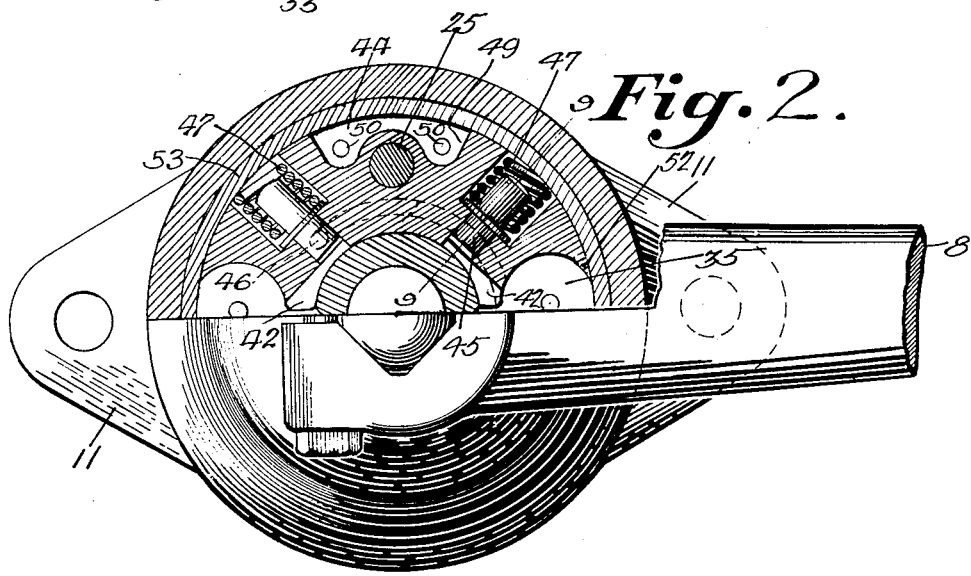
Fig. 2 is a front elevation thereof partially in transverse section as indicated by the line 2—2 of Fig. 3.

Referring now more particularly to the drawings, the numeral 10 generally designates a housing provided with apertured ears 11 or some similar means permitting its ready attachment to the vehicle. The end walls of this casing include a fixed wall 12 and an axially-movable wall 13, which is threaded into the housing. Interiorly, the housing is provided with an annular seat-forming shoulder 14 facing the removable cover plate and disposed intermediate the end walls 12 and 13. End wall 12 has an axial opening 15 and surrounding this opening in spaced relation thereto is provided an inwardly-projecting annular flange 16, the inner end face of which is co-planar with the shoulder 14. Projecting inwardly from the stationary wall axially of this flange is a lug 17 of slightly less depth than the flange 16 and provided with a bottomed hole 18. Through the wall of casing 10 between shoulder 14 and wall 12, a plugged filling opening 19 is provided, opening to the casing at one side of and adjacent to lug 17. In alignment with the inner end of lug 17, the flange 16 is notched at its inner edge as indicated at 20.

Seated against the shoulder 14 and the inner end of flange 16 is a partition comprising main and auxiliary plates 21 and 22. The main plate 21 is formed with an axial opening defined at the outer face of the plate by an outwardly-projecting hub 23 extending into and having a close fit in the flange 16. Plates 21 and 22, have aligned openings, as at 24, adapted for the passage of a dowel pin 25 seated in the bottomed opening 18 of lug 17, so that relative rotation of the partition and casing is prevented. The hub 23 has at its end face a radial groove 26 communicating with a horizontal groove 27 upon the exterior of the hub and aligned and communicating with the notch 20 of flange 16.

Abutting the inner face of the partition element is a rotatable piston 28 having an axially projecting shaft 29 extending through the axial opening of the partition and its hub and through the axial opening 15 of the wall 12. To the shaft outwardly of the hub 23 of the partition, a collar 30 is sweated or otherwise secured, this collar functioning both as a stop to limit movement of fluid along shaft 29 and as a follower for compressing packing 31 disposed in the space between the shaft, flange 16, collar 30 and end wall 12. It will be noted that the collar 30 will serve to secure the piston and the partition element against relative axial displacement and will insure their maintenance at all times in assembled relation. The piston 28 is normally disposed in a neutral position, hereinafter more fully defined, and the partition element has formed therein ports 32 controlled by check valves 33 which place the storage compartment 34, formed between the end wall 12 and the partition element, in communication with the working chamber 35 at opposite sides of the piston when in this neutral position, these ports being of such character that communication is provided throughout the entire travel of the piston. Check valves 33 permit flow only from the storage chamber to the working chamber. The ports 32 are conveniently constructed by arcuately grooving the inner face of the main partition plate 21, as indicated at 36, and providing openings through the plate at the lower ends of these grooves which are formed as valve seats 37. The auxiliary partition plate 22 is formed with openings 38 aligning with the upper ends of the grooves. Partition plates 21 and 22 have each formed therethrough a pair of aligned openings 39 disposed at the upper portions of these plates, the purpose of which will hereinafter appear.

Figure 5:
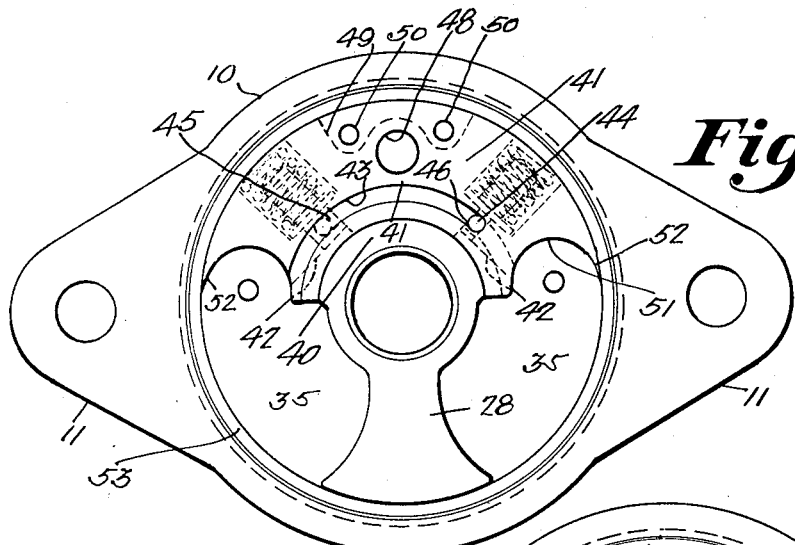
Fig. 5 is a rear elevation with the cover plate removed.
Figure 4:
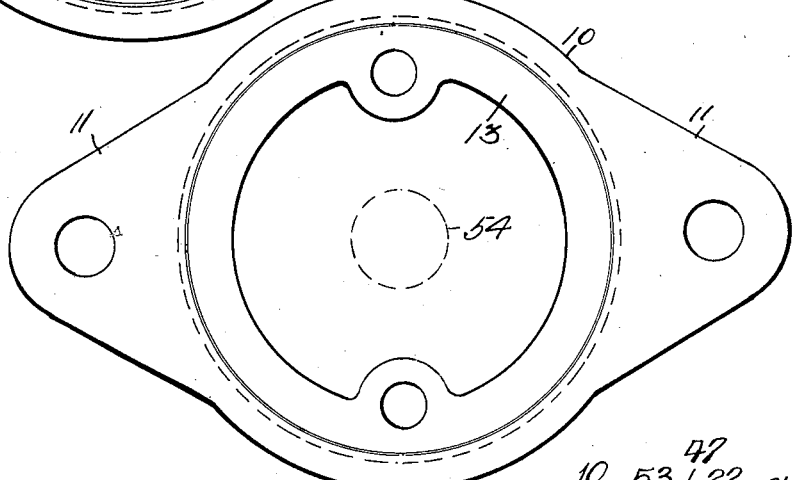
Fig. 4 is a rear elevation thereof.
Figure 3:
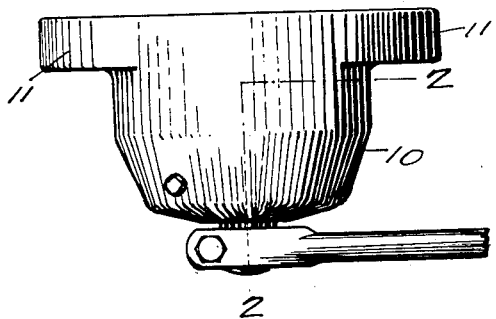
Fig. 3 is a plan view thereof.
Figure 9:
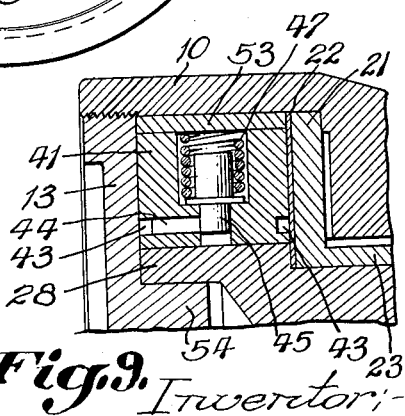
Fig. 9 is a fragmentary detail sectional view taken on line 9—9 of Fig. 2 showing the port arrangement.
Figure 8:
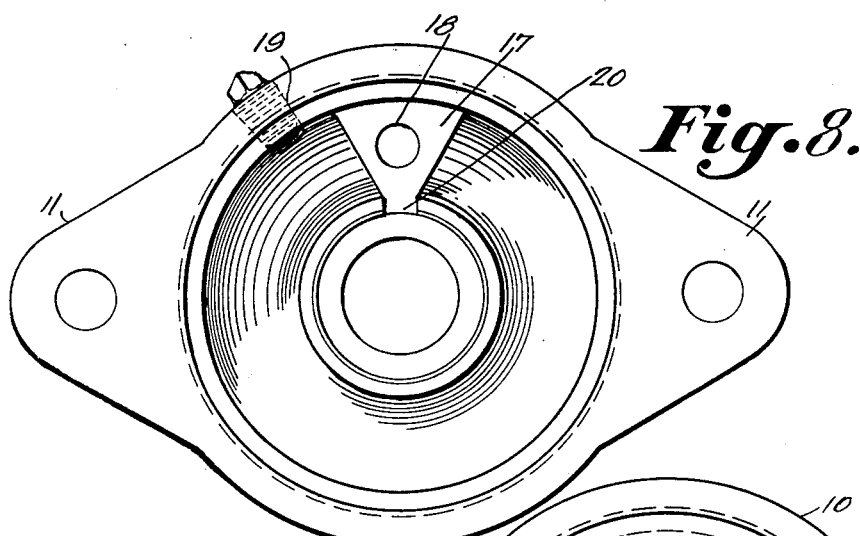
Fig. 8 is a rear elevation of the stripped housing.
Figure 7:
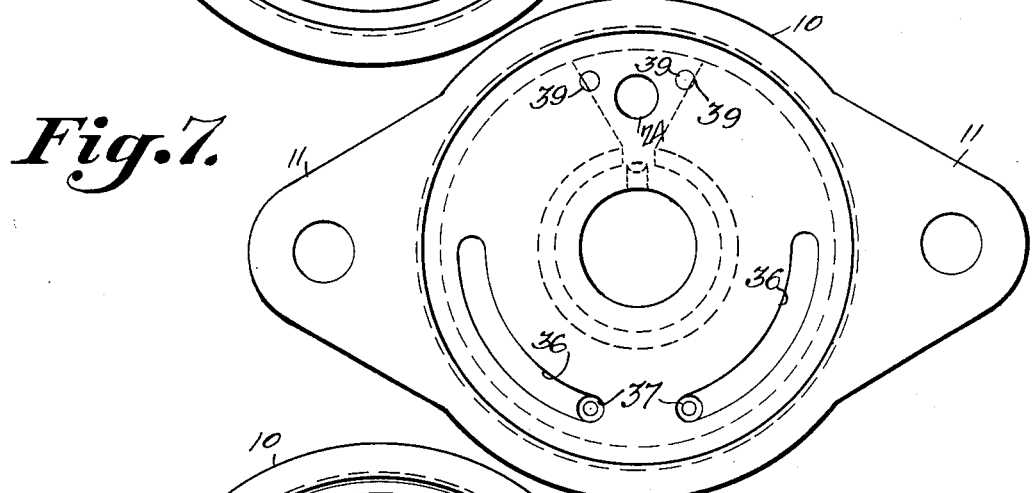
Fig. 7 is a view similar to that of Fig. 6 with the auxiliary partition plate removed.
Figure 6:
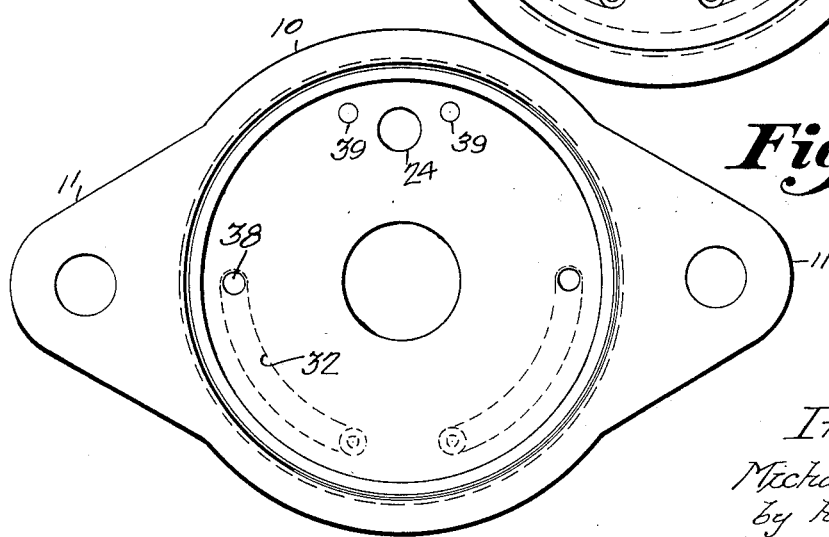
Fig. 6 is a rear elevation with the piston and valve chamber removed.

The piston 28 is in the form of a radial blade having its outer face arcuately curved and having a hub portion 40. Abutting this hub portion is a valve casing 41 having its inner face curved to conform to the curvature of said hub portion and its outer face curved upon the same radius as the outer face of blade 28. The inner face of this valve casing has extending inwardly from opposite ends thereof short channels 42 and in its side faces has arcuate channels 43 each extending from a point in alignment with the inner end of a channel 42 to and through the end face of the valve casing opposite that through which the said channel 42 opens. Channels 42 and 43 are connected by transversely-extending passages 44 and, in each instance, communication between a channel 42 and its associated channel 43 is controlled by a spring-pressed piston valve operating radially in the valve casing and controlling the extent of communication by the extent of its movement. These valves are of different sizes, as will be obvious from an inspection of Fig. 5, one valve indicated at 45 having about four times the area of the other valve, which is indicated at 46. Since the springs 47 of these valves are identical, it will be obvious that the piston valve, having the greater area subjected to pressure, will move most rapidly to the open position, so that the pressure resisting movement of piston 28 toward one end of the valve casing will be greater than the pressure resisting its movement toward the opposite end thereof. The valve casing 41 has a bore 48 for the reception of dowel pin 25, this bore extending entirely therethrough to permit reversal of the valve casing upon the dowel pin, so that the direction in which the piston moves with the greatest resistance may be regulated by this reversal.

The valve casing is further formed with a void or recess 49, the inner and outer walls of which are provided with aligned ports 50, aligning with the openings 39 of the partition, so that, without regard which face of the valve casing is disposed against the partition, this void will be in communication through ports 50 and openings 39 with the storage chamber 34. Opposite end faces of the valve casing are preferably notched, as indicated at 51, to assist in centralizing pressure against these ends and to produce, at the outer edges of such ends, relatively thin, flexible terminals 52. The diameter of the path upon which the outer face of piston 28 moves is less than the internal diameter of the casing 10 inwardly of shoulder 14 and the piston and valve casing are surrounded by an annular bushing or side wall 53 with which the valve casing and piston have a sliding fit. The inner end of this bushing seats and seals against the partition, while the outer end thereof has sealing engagement with the cover plate 13, which cover plate also seats against the inner face of the valve casing 41 and is slidably engaged by the inner face of piston 28. Projecting inwardly from the cover plate is an axial lug 54 engaging in a socket 55 formed in the hub of piston 28 for its reception.

From the foregoing, it will be obvious that in assembling the structure, it is simply necessary that the piston and partition, which is hereinbefore set forth, are permanently connected in the form of a unit, have applied thereto the valve casing 41 and bushing 54, dowel pin 25 serving to maintain the valve casing in its proper position. This assembly is inserted in the casing 10 and cover plate 13 applied to provide a support for the inner end of the piston and to force bushing 53 into sealing engagement with the partition and thus the partition into position upon its seat upon shoulder 14 and inner end of flange 16. The cover plate, by its sealing engagement with this bushing, effectively seals the working chamber. Attention is directed to the fact that since the partition is supported about its hub portion, pressure generated within the working chamber may not cause this plate to bulge outwardly about its hub and thus provide a by-pass through which the fluid employed in the working chamber may escape by the piston. Attention is further directed to the fact that by forming the communication ports between the chambers on opposite sides of piston 28 and the reserve supply chamber 34 entirely in the partition considerable accuracy in machining, which was necessary in my prior structure, is eliminated, and, furthermore, the plate 22, in addition to performing the function which it performs at its prior structure, likewise serves as a keeper to prevent displacement of the check valve 33. It further will be noted that the only accuracy in machining which is necessary in the housing of this structure is upon shoulders 14 and the inner end of flange 16 which must be co-planar. The internal diameter of the casing inwardly of the shoulder may vary considerably without in any way affecting the operation of the apparatus.

The operation of the apparatus is effectually identical with that of the prior application above identified. As the piston 28 moves toward either end of valve casing 41, the fluid trapped between this piston and said end, must pass through the channel 42 opening through said end and the channel 43 associated therewith to the opposite side of the valve casing. The pressure of springs 47 determine the resistance to movement and there is a further resistance due to the relatively small size of the by-pass ports 44. Considerable pressure is accordingly built up by the valve casing 41 and the piston during such movements and this pressure acting against the relatively flexible ends 52 will force them outwardly so that they will come into firm sealing engagement with bushing 53, preventing any circumferential leakage about the valve casing. In event of a loss of fluid from the working chamber, a partial vacuum will be formed with the result that as the piston moves toward one end of casing 41, the port between the opposite end of casing 41 and the piston will admit fluid to this space to replace that which has been lost. In the event of any leakage longitudinally of shaft 29, the fluid will be checked in its outward movement by collar 30 and will pass through grooves 26 and 27 and notch 20 to the reserve chamber 34. The void or recess 49 merely constitutes an expansion chamber to which the fluid may pass in event of excessive expansion thereof.

Since the construction illustrated is obviously capable of considerable change and modification without departing from the spirit of the invention, I do not wish to limit myself thereto except as hereinafter claimed.

I claim:

1. In a hydraulic shock absorber of the oscillatory piston type, a working chamber for the piston having end walls one of which is axially movable in installation, a side wall clamped between said end walls and having sealing engagement at its ends with said end walls, a housing for said working chamber having an interiorly-formed seat for the other end wall of the working chamber, the movable end wall of said working chamber forming an end wall for said housing, the housing further including a stationary end wall in spaced relation to the stationary wall of the working chamber to provide a storage compartment, and means extending inwardly from the stationary wall of the housing and engaging the stationary wall of the working chamber about the center thereof to support the same, the stationary walls of said chamber and housing having axial openings for the passage of a shaft for the piston, the stationary wall of the housing being surrounded by an annular flange, the inner end of said flange engaging the stationary wall of the chamber to support the same, the stationary wall of the working chamber having about the axial opening thereof a hub projecting into and interiorly fitting the flange of the stationary wall of the housing.

2. In a hydraulic shock absorber, a housing having end walls one of which is axially movable in installation, a side wall, said side wall having an internal seat intermediate the ends thereof and facing said movable end wall, a partition seated upon said seat and subdividing the casing into working and storage compartments, a valve casing in the working compartment and having valve-controlled by-passes connecting opposite ends thereof, a rotating piston likewise in the working chamber and sub-dividing the space between the ends of the valve casing into chambers, check-valved port means in said partition connecting said chambers and the storage compartment, the stationary wall of the housing and said partition having axial openings, a shaft for the piston extending through said openings, and a flange upon the inner face of the stationary wall of the housing surrounding said shaft in spaced relation and having its inner end coplanar with said seat.

3. In a hydraulic shock absorber, a housing having end walls one of which is axially movable, a side wall, said side wall having an internal seat intermediate the ends thereof and facing said movable end wall, a partition seated upon said seat and subdividing the casing into working and storage compartments, a valve casing in the working compartment and having valve-controlled by-passes connecting opposite ends thereof, a rotating piston likewise in the working chamber and subdividing the space between the ends of the valve casing into chambers, check-valve port means in said partition connecting said chambers and the storage compartment, the stationary wall of the housing and said partition having axial openings, a shaft for the piston extending through said openings, and a flange upon the inner face of the stationary wall of the housing surrounding said shaft in spaced relation and having its inner end coplanar with said seat, the outer face of the partition having a hub surrounding said shaft and interiorly fitting said flange.

4. In a hydraulic shock absorber, a housing having end walls one of which is axially movable in installation, a side wall, said side wall having an internal seat intermediate the ends thereof and facing said movable end wall, a partition seated upon said seat and subdividing the casing into working and storage compartments, a shaft axially journaled in said partition and the stationary wall of the housing, a piston fixed to said shaft in the working compartment, a member coacting with the piston to divide the working compartment into two chambers, oppositely-checked by-passes connecting said chambers, check-valved port means in said partition connecting said chambers and the storage compartment, and an annular wall surrounding said member and piston within the working chamber and having sealing engagement with each thereof, said annular wall being clamped between the partition and movable wall of the housing and having sealing engagement with each thereof.

5. In a hydraulic shock absorber, a housing having end walls one of which is axially movable in installation, a side wall, said side wall having an internal seat intermediate the ends thereof and facing said movable end wall, a partition seated upon said seat and subdividing the casing into working and storage compartments, a shaft axially journaled in said partition and the stationary wall of the housing, a piston fixed to said shaft in the working compartment, a member coacting with the piston to divide the working compartment into two chambers, oppositely-checked by-passes connecting said chambers, check-valved port means in said partition connecting said chambers and the storage compartment, an annular wall surrounding said member and piston within the working chamber and having sealing engagement with each thereof, said annular wall being clamped between the partition and movable wall of the housing having sealing engagement with each thereof, and means extending inwardly from the stationary end wall of the housing and engaging said partition about the shaft to support the same.

6. In a hydraulic shock absorber, a housing having end walls one of which is axially movable in installation, a side wall, said side wall having an internal seat intermediate the ends thereof and facing said movable end wall, a partition seated upon said seat and subdividing the casing into working and storage compartments, a shaft axially journaled in said partition and the stationary wall of the housing, a piston fixed to said shaft in the working compartments, a member coacting with the piston to divide the working compartment into two chambers, oppositely-checked by-passes connecting said chambers, check-valved port means in said partition connecting said chambers and the storage compartment, a flange upon the inner face of the stationary wall about and in spaced relation to the shaft, said flange having its inner end coplanar with said seat, and a collar fixed to said shaft within said flange and internally fitting the flange.

7. In a hydraulic shock absorber, a housing having end walls one of which is axially movable in installation, a side wall, said side wall having an internal seat intermediate the ends thereof and facing said movable end wall, a partition seated upon said seat and subdividing the casing into working and storage compartments, a shaft axially journaled in said partition and the stationary wall of the housing, a piston fixed to said shaft in the working compartments, a member coacting with the piston to divide the working compartment into two chambers, oppositely-checked by-passes connecting said chambers, check-valved port means in said partition connecting said chambers and the storage compartment, a flange upon the inner face of the stationary wall about and in spaced relation to the shaft, said flange having its inner end coplanar with said seat, and a collar fixed to said shaft within said flange and internally fitting the flange, said collar being disposed in spaced relation to the partition, the partition having a hub extending into the flange and having its inner end engaged with said collar.

8. In a hydraulic shock absorber, a housing having end walls one of which is axially movable in installation, a side wall, said side wall having an internal seat intermediate the ends thereof and facing said movable end wall, a partition seated upon said seat and subdividing the casing into working and storage compartments, a shaft axially journaled in said partition and the stationary wall of the housing, a piston fixed to said shaft in the working compartments, a member coacting with the piston to divide the working compartment into two chambers, oppositely-checked by-passes connecting said chambers, check-valved port means in said partition connecting said chambers and the storage compartment, a flange upon the inner face of the stationary wall about and in spaced relation to the shaft, said flange having its inner end coplanar with said seat, and a collar fixed to said shaft within said flange and internally fitting the flange, said collar being disposed in spaced relation to the partition, the partition having a hub extending into the flange and having its inner end engaged with said collar, said hub internally fitting said flange.

9. In a hydraulic shock absorber, a housing having end walls one of which is axially movable in installation, a side wall, said side wall having an internal seat at the ends thereof and facing said movable end wall, a partition seated upon said seat and subdividing the casing into working and storage compartments, a valve casing in the working compartment and having valve-controlled by-passes connecting opposite ends thereof, a rotating piston likewise in the working chamber and subdividing the space between the ends of the valve casing into chambers, check-valve port means in said partition connecting said chambers and the storage compartment, the stationary wall of the housing and said partition having axial openings, a shaft for the piston extending through said openings, a flange upon the inner face of the stationary wall of the housing surrounding said shaft in spaced relation and having its inner end coplanar with said seat, the outer face of the partition having a hub surrounding said shaft and interiorly fitting said flange, and a collar on said shaft at the outer end of the hub.

10. In a hydraulic shock absorber, a housing having end walls one of which is axially movable in installation, a side wall, said side wall having an internal seat at the ends thereof and facing said movable end wall, a partition seated upon said seat and subdividing the casing into working and storage compartments, a valve casing in the working compartment and having valve-controlled by-passes connecting opposite ends thereof, a rotating piston likewise in the working chamber and subdividing the space between the ends of the valve casing into chambers, check-valve port means in said partition connecting said chambers and the storage compartment, the stationary wall of the housing and said partition having axial openings, a shaft for the piston extending through said openings, a flange upon the inner face of the stationary wall of the housing surrounding said shaft in spaced relation and having its inner end coplanar with said seat, the outer face of the partition having a hub surrounding said shaft and interiorly fitting said flange, and a collar on said shaft at the outer end of the hub, the inner end of said flange having a notch communicating with the storage compartment, the outer and end faces of said hub having communicating grooves which communicate with the notch of the flange.

11. A casing for shock absorbers comprising an outer cup-shaped section and an inner cup-shaped section fitted therein, the outer section having the greater depth and having an internal shoulder intermediate the ends of its side wall upon which the bottom of the inner cup-shaped section is seated, and a common closure for the mouths of said sections maintaining the inner section in engagement with said shoulder, the end walls of said sections having co-axial openings, there being a flange extending inwardly from the end wall of the outer section and surrounding the opening thereof in spaced relation, the inner end of said flange engaging the confronting face of the end wall of the inner section, the end wall of the inner section having at its outer face a flange surrounding the opening thereof and interiorly fitting the flange of the outer section.

12. In a hydraulic shock absorber of the oscillatory piston type, a working chamber for the piston having end walls one of which is axially movable in installation, a side wall sealed at its ends to said end walls and a housing for said working chamber having an interiorly formed seat for the other end wall of the working chamber, the movable end wall of said working chamber forming an end wall for said housing, the housing further having a stationary end wall in spaced relation to the last-named end wall of the working chamber to provide a storage compartment, the stationary end wall of the housing and the said other end wall of the working chamber having axial openings for the passage of a shaft for the piston, the opening of the stationary wall of the housing being surrounded by an annular flange the inner end of which engages the last-named end wall of the chamber about the opening thereof, the last-named end wall of the working chamber having about the axial opening thereof a hub projecting into and interiorly fitting said flange.

MICHAEL FIELDMAN.